(12) United States Patent
Cray et al.

(10) Patent No.: US 6,806,339 B2
(45) Date of Patent: Oct. 19, 2004

(54) SILICONE RELEASE COATING COMPOSITIONS

(75) Inventors: Stephen Edward Cray, Sully (GB); John Francis, Neath (GB)

(73) Assignee: Dow Corning Limited, Barry (GB)

( * ) Notice: Subject to any disclaimer, the term of this patent is extended or adjusted under 35 U.S.C. 154(b) by 0 days.

(21) Appl. No.: 09/992,572

(22) Filed: Nov. 5, 2001

(65) Prior Publication Data

US 2002/0061998 A1 May 23, 2002

Related U.S. Application Data

(62) Division of application No. 09/614,471, filed on Jul. 11, 2000, now abandoned.

(30) Foreign Application Priority Data

Jul. 23, 1999 (GB) .............................................. 9917372

(51) Int. Cl.$^7$ .............................................. C08G 77/08
(52) U.S. Cl. .............................. 528/15; 528/31; 528/32; 524/588; 524/862
(58) Field of Search .............................. 528/15, 31, 32, 528/39; 524/588, 862; 428/447

(56) References Cited

U.S. PATENT DOCUMENTS

| | | | |
|---|---|---|---|
| 4,386,135 A | 5/1983 | Campbell et al. ........... | 428/447 |
| 4,772,515 A | 9/1988 | Hara et al. ................... | 428/447 |
| 4,774,111 A | 9/1988 | Lo .............................. | 427/387 |
| 5,063,254 A | 11/1991 | Nakos .......................... | 522/43 |
| 5,077,369 A | 12/1991 | de Montigny et al. ........ | 528/15 |
| 5,198,476 A | 3/1993 | Kobayashi et al. ........... | 522/31 |
| 5,272,225 A | 12/1993 | Ogawa et al. ............... | 525/477 |
| 5,446,087 A | 8/1995 | Chizat et al. ............... | 524/588 |
| 5,468,816 A | 11/1995 | Hurford et al. ............. | 525/479 |
| 5,616,672 A | 4/1997 | O'Brien et al. ............... | 528/32 |
| 5,741,834 A * | 4/1998 | Ward et al. .................. | 523/213 |
| 6,063,889 A | 5/2000 | Friebe et al. ................. | 528/32 |
| 6,369,184 B1 * | 4/2002 | Bohin et al. .................. | 528/15 |

FOREIGN PATENT DOCUMENTS

| | | | | |
|---|---|---|---|---|
| EP | 400 614 | * | 5/1990 | |
| EP | 0559575 A1 | | 9/1993 | ........... C08G/77/20 |

\* cited by examiner

Primary Examiner—Margaret G. Moore
(74) Attorney, Agent, or Firm—Patricia M. Scaduto

(57) ABSTRACT

A branched siloxane contains at least three aliphatically unsaturated hydrocarbon groups, is terminated by units of the formula $R^aR^b{}_2SiO_{1/2}$ and otherwise consists of:

i) one or more units of the formula $(SiO_{4/2})$; and ii) from 15 to 995 units of the formula $R^b{}_2SiO_{2/2}$ which units (i) and (ii) may be inter-linked in any appropriate combination. The invention includes a method of making the branched siloxane and release coating and release modifier compositions containing the branched siloxane.

9 Claims, No Drawings

SILICONE RELEASE COATING COMPOSITIONS

This application is a divisional of U.S. patent application Ser. No. 09/614,471, filed Jul. 11, 2000 now abandoned.

This invention relates to a novel branched siloxane and also to silicone based release coating compositions and release modifier compositions containing the aforementioned branched siloxane.

Silicone based release coatings are useful in applications where relatively non-adhesive surfaces are required. Single sided liners, for example, backing papers for pressure sensitive adhesive labels, are usually adapted to temporarily retain the labels without affecting the adhesive properties of the labels. Double sided liners for example, interleaving papers for double sided and transfer tapes, are utilised to ensure the protection and desired unwind characteristics of a double sided self-adhesive tape or adhesive film.

A substrate, for example a single sided liner, is coated by applying a silicone based release coating composition onto the substrate and subsequently curing the composition, by, for example, thermally initiated hydrosilylation.

The basic constituents of silicone based release coating compositions which are cured by hydrosilylation are:

1) an alkenylated polydiorganosiloxane, typically a linear polymer with terminal alkenyl groups,
2) a polyorganohydrogensiloxane cross-linking agent, designed to cross-link the alkenylated polydiorganosiloxane and
3) a catalyst, to catalyse the aforementioned cross-linking reaction.

Often a fourth constituent, an inhibitor designed to prevent the commencement of curing below a prerequisite cure temperature, is also included in the composition.

Silicone based release coating compositions consisting of the three essential constituents and optionally the inhibitor are generally referred to as premium release coating compositions.

In order to control the level of release force from a release coating it has become common practice for a silicone based release coating composition to contain an additive, generally known as a release modifier. The release modifier usually replaces a proportion of the alkenylated polydiorganosiloxane in a premium release coating composition.

Improvements in the performance of release coatings are continuously being sought with respect to, for example, ease of cure, i.e. the decrease in cure times at relatively low temperatures, anchorage of coatings to a substrate and release performance. One factor which particularly necessitates continued development of release coatings is the use of an ever increasing number of substrates, for example, polypropylene, polyethylene and polyester onto which release coating compositions are applied and cured.

U.S. Pat. No. 4,772,515 describes a silicone release coating composition having the three essential constituents discussed above, wherein the polydiorganosiloxane must have in a single molecule at least two groups of the following general formula:

$$R^c(R^f)_2SiO_{1/2}((R^g)_2SiO_{2/2})_hR^jSiO_{3/2}$$

where $R^c$ is an alkenyl group; each $R^f$, $R^g$ and $R^j$ are independently hydrogen, hydroxyl or a monovalent organic group and h is 0 or an integer between 1 and 300 inclusive. The resultant release coating composition is made by merely mixing the three constituents together.

U.S. Pat. No. 4,774,111 describes a silicone based release coating composition comprising an organosilicon compound having on average one to three silicon bonded monovalent hydrocarbon or halohydrocarbon radicals per silicon atom. An average of at least two of these groups being olefinic groups and the remaining silicon vacancies being satisfied by divalent radicals free of aliphatic unsaturation which link the silicon atoms together.

EP-A-559575 describes a silicone based release composition containing the three essential constituents and an additional constituent comprising a silicone containing a plurality of ethylenically unsaturated groups having from four to twelve carbon atoms wherein from 25 to 90 mole % of the total number of siloxane groups are T units.

For the sake of clarification M, D, T and Q units represent units of the empirical formulae $R_3SiO_{1/2}$, $R_2SiO_{2/2}$, $RSiO_{3/2}$ and $SiO_{4/2}$ respectively, wherein each R group is a monovalent substituent.

U.S. Pat. No. 5,616,672 describes the use of a substantially branched curable alkenyl silicone consisting of M, D and T groups and having on average at least two branching points per molecule. These compounds are said to be useful in release coating compositions.

U.S. Pat. No. 5,063,254 describes a polysiloxane comprising a linear polydiorganosiloxane chain having 25 to 1000 repeating units joined at one end to an acrylic end group and at its other end to a crosslinked MTQ moiety wherein the ratio of M units to T and Q units M/(T+Q) is 0.55–0.75. The M and/or T units may also contain (meth) acrylate groups. The polysiloxane has utility in potting and conformal coating.

A branched siloxane according to a first aspect of the present invention consists of:

i) one or more Q units of the formula $(SiO_{4/2})$ and
ii) from 15 to 995 D units of the formula $R^b_2SiO_{2/2}$ which units (i) and (ii) may be inter-linked in any appropriate combination, and
iii) M units of the formula $R^aR^b_2SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three Ra substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group.

The branched siloxane preferably contains at least two polydiorganosiloxane chains of the formula $(R^b_2SiO_{2/2})n$ where each n is independently from 2 to 100.

A branched siloxane according to a second aspect of the invention contains at least three aliphatically unsaturated hydrocarbon groups, terminated by units of the formula $R^aR^b_2SiO_{1/2}$ and otherwise consists of:

i) one or more units of the formula$(SiO_{4/2})$; and
ii) at least two polydiorganosiloxane chains of the formula $(R^b_2SiO_{2/2})n$, where each n is independently from 2 to 100, the total $R^b_2SiO_{2/2}$ units in the branched siloxane being from 15 to 995 units, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms and each $R^b$ substituent is selected from the group consisting of an alkyl group having from 1 to 6 carbon atoms, an aryl group, an alkoxy group, an acrylate group and a methacrylate group.

Preferably the aliphatically unsaturated hydrocarbon groups are either alkenyl or alkynyl groups.

Preferably at least 50% of $R^a$ substituents are alkenyl groups. Most preferably each $R^a$ substituent is an alkenyl group.

Each alkenyl group may be selected from vinyl, allyl, butenyl, pentenyl and hexenyl groups but is preferably selected from a vinyl (vi) and a hexenyl (hex) group.

The branched siloxane most preferably comprises at least one Q unit bonded to four $(R^b{}_2SiO_{2/2})n$ chains and for example can have the formula

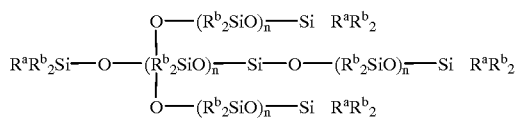

where each n is independently from 1 to 100.

Preferably each $R^b$ substituent is an alkyl groups for example, a methyl, ethyl, propyl, isopropyl, butyl, pentyl or hexyl group; preferred are methyl and ethyl groups but the most preferred is a methyl group. Hence, in the case when there is only a single unit of the formula $SiO_{4/2}$ present in the branched siloxane according to the first aspect of the present invention, the branched siloxane may have substantially the following formula wherein each n is independently from 1 to 100 when each $R^a$ substituent is a vinyl group and each $R^b$ group is a methyl group.

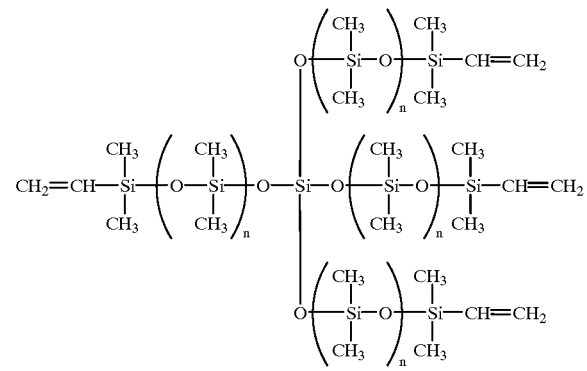

It is to be appreciated that in view of the size of the branched siloxane, it is possible that a very small number of the siloxane units present in the branched siloxane (preferably less than 1%) may be units of the formula $R^bSiO_{3/2}$, where $R^b$ is as previously defined, may occur.

Preferably the branched siloxane in accordance with the first aspect of the present invention has a viscosity of not less than 50 mm$^2$/s and not more than 10000 mm$^2$/s at 25° C., more preferably the viscosity is from 50 to 1000 mm$^2$/s.

Henceforth the number of siloxane units in the branched siloxane will be referred to as the degree of polymerisation (DP).

The DP of the branched siloxane may be from 20 to 1000. A preferred range is from 20 to 500 but the most preferred range is from 20 to 250.

A method according to the invention for the preparation of a branched siloxane comprises the steps of:

a) mixing a compound having the general formula $(SiO_{4/2})(R^aR^b{}_2SiO_{1/2})_4$ with a cyclic polydiorganosiloxane, and/or a substantially linear hydroxy terminated polydiorganosiloxane wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms and each $R^b$ substituent is selected from the group consisting of an alkyl group having from 1 to 6 carbon atoms, an aryl group, an alkoxy group, an acrylate group and a methacrylate group;

b) causing the mixture to react in the presence of an acid or phosphazene base catalyst at a temperature of up to 180° C.; and c) neutralising the reaction mixture Preferably each cyclic polydiorganosiloxane contains from 3 to 10 $R^b{}_2SiO_{2/2}$ units although it is preferred that the cyclic polydiorganosiloxanes are polydialkylsiloxane rings consisting of from 3 to 6 repeating $R^b{}_2SiO_{2/2}$ units in which each $R^b$ substituent is a methyl group.

The type of reaction which takes place is either an acid or a base catalysed equilibration reaction dependent on the chosen catalyst.

In the case of acid catalysed equilibration reactions, the acid catalyst used may be any catalyst suitable the catalysis of an acid based equilibration reaction for example trifluoromethyl sulphonic acid, acid clays, for example, ambelyst and phosphonitrile chloride catalysts. A preferred catalyst is a trifluoromethane sulphonic acid.

In the case of basic catalysed equilibration preparations the catalyst may be any suitable phosphazene base catalyst, for example phosphazene bases of the following general formulae:

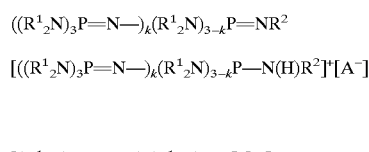

or

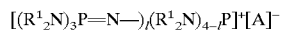

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ alkyl group; k is 1, 2 or 3, preferably 2 or 3; 1 is 1, 2, 3 or 4, preferably 2, 3 or 4; and A is an anion, preferably fluoride, hydroxide, silanolate, alkoxide, carbonate or bicarbonate. Particularly preferred are aminophosphazenium hydroxides.

In the case of the acid catalysed equilibration reaction the reaction mixture is preferably maintained at a temperature of from 75° to 120°, most preferably the reaction mixture is maintained at a temperature of from 80 to 90° C. in the presence of a water co-catalyst. In the case of the base catalysed equilibration reaction the reaction mixture is preferably maintained at a temperature of from 120° and 160°, most preferably the reaction mixture is maintained at a temperature of from 130° to 150° C.

Any appropriate neutralising agent may be utilised the choice clearly being dependent on the acidic or basic nature of the catalyst, examples include the use of bisdimethylsilylphosphonate for base catalysed equilibrium reactions and calcium carbonate for acid catalysed equilibration reactions.

The amount of each constituent used in the method is dependent on two factors, the required degree of polymerisation of the branched siloxane and the number of alkenyl groups required in the branched siloxane. Preferably there is from 1.1 to 22.1% by weight of $(SiO_{4/2})(R^aR^b{}_2SiO_{1/2})_4$ in the mixture of step (a), more preferably from 2.21 to 11.04% by weight of $(SiO_{4/2})(R^aR^b{}_2SiO_{1/2})_4$ present and most preferably from 3.45 to 6.9% by weight. The remainder is made up to 100% by weight with the cyclic polydiorganosiloxane and/or the substantially linear hydroxy terminated polydiorganosiloxane.

A release coating composition according to the present invention comprises:
1) a branched siloxane as described above;
2) an organohydrogenpolysiloxane cross-linking agent in an amount such that the ratio of the total number of Si—H groups in the composition to aliphatically unsaturated hydrocarbon groups in the composition is from 0.9:1 to 3:1; and
3) a sufficient amount of a hydrosilylation catalyst effective to catalyse the reaction between the branched siloxane and the cross-linking agent.

The organohydrogenpolysiloxane cross linking agent must contain at least three Si—H groups and may have the general formula:

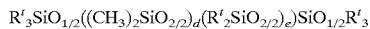

where each $R^t$ may be an alkyl group having 1 to 4 carbon atoms or hydrogen, d is 0 or an integer, e is an integer such that d+e is from 8 to 100. Alternatively the cross-linking agent may be an MQ resin consisting of units of the general formula $SiO_{4/2}$ and $R^q{}_3SiO_{1/2}$ wherein at least one $R^q$ substituent is a hydrogen atom and the remainder are alkyl groups.

Preferably the ratio of the total amount of Si—H groups: alkene groups in the release coating composition is in the range of from 1.1:1 to 2.5:1, most preferably the range is from 1.2:1 to 2:1.

Suitable hydrosilylation catalysts include complexes or compounds of group VIII metals, for example, platinum, ruthenium, rhodium, palladium, osmium and indium. Preferred catalysts are platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, $PtCl_2$. $PtCl_3$ and $Pt(CN)_3$. Alternatively the catalyst may be a rhodium complex, for example, $RhCl_3(Bu_2S)_3$.

The composition may additionally comprise one or more inhibitors adapted to prevent the cure of the coating composition from occurring below a predetermined temperature. Whilst an inhibitor is not essential to the functioning of the coating composition itself it is to be understood that in the absence of an inhibitor the catalyst may initiate/catalyse the cure of the silicone based release coating composition at ambient temperature, once the three essential constituents have been mixed together.

Examples of suitable inhibitors include ethylenically or aromatically unsaturated amides, acetylenic compounds, ethylenically unsaturated isocyanates, olefinic siloxanes, unsaturated hydrocarbon diesters, conjugated eneynes, hydroperoxides, nitrites and diaziridines, specific examples include methyl butynol, dimethyl hexynol or ethynyl cyclohexanol, trimethyl(3,5-dimethyl-1-hexyn-3-oxy) silane, a maleate for example, Bis(2-methoxy-1-methylethyl)maleate, a fumarate e.g. diethylfumarate or a fumarate/alcohol mixture wherein the alcohol is, for example, benzyl alcohol or 1-octanol and ethenyl cyclohexyl-1-ol.

Preferably the release coating composition in accordance with the fourth aspect of the present invention has a viscosity of not less than 50 mm$^2$/s and not more than 10000 mm$^2$/s at 25° C., more preferably the viscosity is from 50 to 1000 mm$^2$/s so that the branched siloxane is of a suitable viscosity for coating a substrate. If the viscosity is lower than 50 mm$^2$/s problems may occur with the wetting of a substrate surface by the release coating composition containing the branched siloxane. If the viscosity is higher than 10000 mm$^2$/s then the release coating composition containing the branched siloxane is too viscous for use in the present application.

The release coating composition may additionally comprise a dialkyl alkenyl silyl terminated polydiorganosiloxane having a viscosity at 25° C. of at least 50 mm$^2$/s of which a dimethyl vinyl silyl terminated or dimethyl hexenyl silyl terminated polydimethylsiloxane is preferred.

Other constituents which may also be added to release coating compositions of the present invention include, for example, silicone release modifiers, fillers, reactive diluents, adhesion promoters, solvents, fragrances, preservatives and fillers, for example, silica, quartz and chalk.

Any appropriate silicone release modifier may be utilised, examples include for example one or more of an alkenylated silicone resin, an alkenylated polydiorganosiloxane, one or more primary alkenes containing from 12 to 30 carbon atoms, and one or more branched alkenes containing at least 10 carbon atoms.

Bath life extenders may be present in an amount sufficient to retard the curing reaction at room temperature. Examples may include compounds which contain one or more primary or secondary alcohol groups, for example, aliphatic and aromatic alcohols with fewer than 10 carbon atoms, such as methanol, ethanol, propanol phenol and cyclohexanol, carboxylic acids and cyclic ethers.

Furthermore, the composition may also comprise a linear alkenyl dialkyl silyl terminated polydiorganosiloxane.

The release coating compositions may be applied solventless or in a solvent or as part of an oil-in-water emulsion.

The present coating composition may be utilised for release purposes on a variety of substrates including paper and films. The films may for example be polyethylene, polypropylene, polyester, polystyrene, oriented polypropylene or biaxially oriented polypropylene films.

It is well known that release coating compositions which may be cured at low temperatures have a tendency to poor long term anchorage. It has been found that release coatings in accordance with the fourth aspect of the present invention both cure at relatively low temperatures and have improved long term anchorage properties. As the cure is good at low temperatures there is minimal transfer of silicones to an adhesive such as the adhesive on a label, which in turn provides the benefit that the strength of the adhesive is maintained. When high cure temperatures are required for release coatings problems occur with the quality of the substrate itself which cause shrinkage or brittle films which in turn means that significantly less rehumidification of the substrate is required after cure of the release coating.

While release coating compositions of the present invention may be prepared by merely premixing the three essential constituents together with any optional ingredients present it may be more desirable to prepare such compositions in separate parts or packages i.e. in the form of a kit. In such a case the portions are combined at the time the composition is to be applied as a coating. With respect to the essential ingredients, the kit may contain either:
a first part comprising the branched siloxane and inhibitor, a second part comprising a release modifier and inhibitor, a third part comprising the catalyst and a fourth part comprising the cross-linking agent; or a first part comprising the branched siloxane and catalyst, a second part comprising a release modifier and the catalyst and a third part comprising the cross-linking agent and inhibitor.

A silicone based release modifier composition in accordance with the present invention may comprise a branched siloxane as described above and at least one additional component selected from the following components:

i) an alkenylated silicone resin ii) an alkenylated polydiorganosiloxane, and iii) one or more primary alkenes containing from 14 to 30 carbon atoms, and iv) one or more branched alkenes containing at least 10 carbon atoms.

Such a release modifier composition is added to a silicone release coating composition.

The alkenylated silicone resin (i) is most preferably at least one alkenylated MQ resin wherein the M groups have the general formula $R^2_3SiO_{1/2}$ and are typically trialkyl siloxy and/or dialkyl alkenyl siloxy groups. The alkenyl group may be selected from the group consisting of cyclohexenyl, vinyl, propenyl, butenyl, pentenyl and hexenyl. Most preferably the alkenyl group is a vinyl or hexenyl group. The alkyl groups may be any suitable alkyl groups, but are most preferably methyl groups. The Q groups are groups of the formula $SiO_{4/2}$ and these M and Q groups may be present in any appropriate ratio.

The alkenylated polydiorganosiloxane, is preferably an alkenyldialkyl silyl terminated polydiorganosiloxane comprising units of the formula $R_2SiO_{2/2}$ wherein each R group is an alkyl group having from 1 to 6 carbon atoms or one R group is an alkyl group as defined and one is an alkenyl group having from 1 to 6 carbon atoms, preferably a vinyl or hexenyl group.

The or each primary alkene (iii) may be any primary alkene containing from 10 to 30 carbon atoms such as, for example, tetradecene and octadecene. The or each branched alkene (iv) may be any one or more suitable branched alkenes, for example, one or more branched alkenes of the general formula

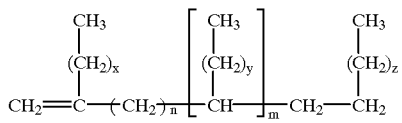

wherein the n number of methylene groups and m number of branched alkyl groups are randomly distributed in the chain, n and m are independently 0 or an integer of from 1 to 20, x, z and each y is independently an integer of from 1 to 12. Preferably the total number of carbon atoms in each alkene is at least 20. It is to be noted that release modifiers containing substantially linear alkenes such as for example component (iii) above tend to cause smoking during the curing process of a coating. It has been found that replacement of component (iii) with a branched alkene as exemplified by component (iv) significantly reduces this problem.

Such a release modifier preferably comprises from 25 to 85% by weight of the branched siloxane in accordance with the present invention, the remainder being made up of one or more of components (i), (ii), (iii) or (iv).

One advantage in using a release modifier in accordance with the present invention is that by replacing at least a proportion of substantially linear alkene with the branched siloxane the smoking effect often seen during the cure process is significantly reduced. It has also been found that the level of extractables, i.e. the level of uncured siloxane, is maintained at the same level or is even reduced when compared to the level of extractables obtained from the unmodified release coating, whereas usually with prior art release modifiers the level of extractables obtained increases, sometimes significantly.

The release modifier composition as described above may be incorporated into a release coating composition in accordance with the present invention or may alternatively be incorporated in a release coating composition comprising an alkenylated polyorganosiloxane, an organohydrogenpolysiloxane cross-linking agent and an effective amount of a hydrosilylation catalyst.

In order that the invention may be become more clear there now follow a number of detailed examples.

Examples 1, 2 and 3 describe methods for the preparation of the branched siloxane in accordance with the second aspect of the present invention. It is to be noted that all viscosities measured in the following examples were measured at 25° C.

EXAMPLE 1

A reaction vessel was charged with $(Vi(CH_3)_2SiO_{1/2})_4$ $(SiO_{4/2})$, (21.6 g), where vi stands for a vinyl group, octamethylcyclotetrasiloxane (592 g) and trifluoromethane sulphonic acid (1.2 g). The reaction mixture was stirred for 6 hours at a temperature of from 80 to 90° C. The resultant mixture was then cooled to room temperature. Calcium carbonate (1.0 g) was added and the mixture was stirred for a further three hours subsequent to which it was set for filtration. Finally the reaction mixture was stripped at a temperature of about 150° C. and a pressure of 40 millibars for 2 hours.

The final viscosity of the product was 270 mm²/s and it was determined that the degree of polymerisation was 160 and the weight % of vinyl groups was 0.83%.

EXAMPLE 2

A reaction vessel was charged with $(Vi(CH_3)_2SiO_{1/2})_4$ $(SiO_{4/2})$, (21.6 g), octamethylcyclotetrasiloxane (370 g) and trifluoromethane sulphonic acid (1.0 g). The reaction mixture was stirred for 6 hours at a temperature of from 80 to 90° C. The resultant mixture was then cooled to room temperature and calcium carbonate (1.0 g) was added and the mixture was stirred for a further three hours, subsequent to which it was set for filtration. Finally the reaction mixture was stripped at a temperature of about 150° C. at a pressure of 40 millibars for 2 hours.

The final viscosity of the product was 160 mm²/s and it was determined that the degree of polymerisation was 100. The weight % of vinyl groups was 1.32%.

EXAMPLE 3

To a reaction flask fitted with an electrical stirrer thermometer probe and reflux condenser were added $(Vi(CH_3)_2 SiO_{1/2})_4(SiO_{4/2})$, (43.2 g) and octamethylcyclotetrasiloxane (592 g). The reaction mixture was heated to 140° C. and the catalyst polyaminophosphazenium hydroxide (0.2 g) was added. After a period of 30 seconds a sample was removed and the viscosity of the sample was measured and a significant increase was seen. The reaction mixture was then neutralised with bisdimethylsilylphosphonate (0.5 g) and allowed to cool to 80° C. Low molecular weight components were stripped out of the mixture and finally the mixture was allowed to cool and was filtered. The resulting product had a degree of polymerisation value of 80 and viscosity of 114 mm²/s.

EXAMPLE 4

The following example details a comparative study of the release performance of a selection of corona treated oriented polypropylene (OPP), monoaxially oriented polypropylene (MOPP) and kraft paper substrates coated with silicone based release coating compositions differing only in the siloxanes incorporated in the compositions. Each silicone based release coating composition contained the siloxane as indicated in Table 1 blended with 120 ppm of a platinum catalyst, sufficient cross linking agent such that the ratio of the total number of Si—H groups:the total number of aliphatically unsaturated hydrocarbon groups was 1.5:1, together with 0.12 weight % of the total composition weight was a methyl butynol inhibitor.

Each composition was applied on to the relevant substrate using a blade coater at room temperature (20° C.) and then the resultant coating was cured at 100° C. for a period of 20 seconds.

The cure characteristics of the resultant coatings were assessed with respect to migration, smear and rub-off. Migration is measured by placing a strip of adhesive (Sellotape®)on the cured release coating, and after removal checking if any of the coating has been transferred to the adhesive tape. Smear is measured by pushing one's finger over the cured coating and checking if there is any visible mark left in the form of a smear. Rub-off is measured by rubbing one's finger hard over the paper back and forth for 10 cycles and checking if any of the coating has been damaged or removed. N/N/N means no migration/no smear and no rub-off. With reference to Table 1, vi, hex, s, M and Tr mean vinyl, hexenyl, slight, migration and trace respectively.

The cure characteristics of the resultant coatings were further assessed by measuring the percentage of extractables in the coating after curing. This was carried out by first determining the coat weight of a standard sized sample of a substrate with a cured coating by x-ray fluorescence using a LabX 3000 X-ray fluorescence spectrometer from Oxford Instruments. The coated sample was then placed in a solution of methyl isobutyl ketone solvent to extract any unreacted siloxane which has not been cross-linked into the coating matrix or adhered to the substrate. After a predetermined period of time the sample was removed from the solvent, dried and reweighed. The percentage extractables indicated in Table 1 are the percentage weight losses after the unreacted silicone had been removed from the coating. It will be noted from Table 1 that for each substrate the samples containing the branched siloxane of the first aspect of the present invention gave lower percentage extractables results when compared with the other polymers used.

The alkenyl end blocked "Polymers" were linear vinyl/hexenyl dimethyl silyl terminated polydimethylsiloxanes. The alkenyl endblocked and pendant "Polymers" are vinyl dimethyl silyl terminated polydimethylsiloxanes with vinyl groups sporadically pendant to the chain. T-branched "Polymers" are vinyl dimethyl silyl terminated polydimethylsiloxanes with siloxane side chains.

Two alternative cross-linking agents were used. They are indicated as Xlinker 1, a trimethyl terminated methyl hydrogen siloxane having a viscosity of 11 mm²/s and xlinker 2, a dimethyl hydrogen terminated methylhydrogen siloxane having a viscosity of 11 mm²/s.

TABLE 1

A comparison of the % of Extractables produced from an assortment of coatings.

| | UCB | | SUBSTRATE | | CLAY COATED |
|---|---|---|---|---|---|
| POLYMER | OPP 30 Xlinker 1 | OPP 50 Xlinker 2 | MOPP 50 Xlinker 1 | MOPP 50 Xlinker 2 | Kraft paper Xlinker 2 |
| alkenyl end blocked | | | | | |
| vi 115 DP & 210 mm²/s | 6.1 | 17.6 | 12.2 | 14.9 | 6.33 |
| Cure assessment | N/N/N | N/sM/N/(Tr) | N/sM/N/(Tr) | N/sM/N(Tr) | |
| Vi 75 DP & 118 mm²/s | 4.9 | | | | 6.7 |
| Vi 50 DP & 85 mm²/s | 2.6 | 12.2 | 10.8 | 10.8 | 4.1 |
| Cure assessment | N/N/N | N/sM/N/(Tr) | N/N/N(sTr) | N/sM/N(Tr) | |
| Hexenyl | 3.7 | | 12.6 | 10.2 | |
| alkenyl end blocked and pendant | | | | | |
| 50 DP 6 mol % vi | 12.1 | 26.3 | 17 | 14.3 | 6.87 |
| Cure assessment | N/N/N | N/M/N(Tr) | N/M/N(Tr) | N/M/N/Tr | |
| 100 DP 8 mol % vi | 11.3 | | | | 8.2 |
| 160 DP 10 mol % vi | 22.3 | | | | 14.53 |
| Hexenyl | 4.9 | | | | |
| Siloxanes of present invention | | | | | |
| 80 DP & 110 mm2/s | 5.7 | 7.4 | 5.9 | 5.3 | 1.94 |
| Cure Assessment | N/N/N | N/Sm/N(Tr) | N/N/N(sTr) | N/Sm/M(Tr) | |
| 100 DP & 160 mm2/s | 4.4 | 7.8 | 7.9 | 5.8 | 1.92 |
| Cure Assessment | N/N/N | N/sM/N/(sTr) | N/sM/N(sTr) | N/sM/N(sTr) | |
| 160 DP & 270 mm2/s | 6.6 | 13.3 | 8.9 | 8.1 | 6.25 |
| Cure Assessment | N/N/N | N/M/N(Tr) | N/N/N(sTr) | N/sN/N(sTr) | |
| T Branched | | | | | |
| 0.47% vi | 19.5 | | | | |
| Cure Assessment | N/N/N | | | | |
| 0.86% vi | 44.9 | | | | |
| Cure Assessment | N/N/N | | | | |
| 1.8% vi | 27.3 | | | | |
| Cure Assessment | N/N/N | | | | |

EXAMPLE 5

The following tests were used to show the variation in the anchorage of a variety of cured release composition coatings over an extended period of time on a corona treated 50 micron monoaxially Oriented polypropylene substrate. It is to be noted that the coatings were cured at relatively low temperatures of 100° C. and that coatings in accordance with the present invention maintained a high anchorage index over the whole two month test period whereas comparative compositions gave either poor cure or poor anchorage.

The procedure for measuring extractables was the same as described in Example 4. The Anchorage index results measure the anchorage or adhesive strength of a cured silicone coating system to a substrate. For each result in Table 3, an identically sized sample of the substrate coated with the relevant premium release coating was cut, and the initial coat weight (g/m$^2$), i.e. the amount of the premium release coating coated on to the surface of the substrate was determined by x-ray fluorescence.

The aforementioned sample was adhered to a flat plastic disc and fitted in to the base of a 3.2 Kg weight. The sample, with the weight applying downward pressure, is then placed on a felt bed with the premium release coated face of the sample in contact with the felt surface. The weighted sample was subsequently moved along a 30 cm length of the felt bed at a pre-set speed of 3 m/min on two occasions, utilising different sections of the felt bed on each occasion and the sample coat weight was remeasured and is indicated as SUBSEQUENT COAT WEIGHT.

The results provided in Table 3 are each determined by way of the following equation:

$$\% \text{ ANCHORAGE INDEX} = \frac{\text{SUBSEQUENT COAT WEIGHT (g/m}^2\text{)}}{\text{INITIAL COAT WEIGHT (g/m}^2\text{)}} \times 100$$

The % Anchorage Index is therefore the percentage of the premium release coating remaining on the surface of the substrate and hence. 100% Anchorage Index equates to no rub off.

The compositions in the following Table comprise a branched siloxane in accordance to the present invention containing an average of 80 siloxane units (80 DP Q) and comparative examples are a linear vinyl dimethyl silyl terminated polydiorganosiloxane having a degree of polymerisation (DP) of 50 and a linear vinyl dimethyl silyl terminated linear polydiorganosiloxane with a degree of polymerisation of 150. The two alternative cross-linking agents were X-linker 1 as used previously and X-linker 3, a trimethyl end blocked methyl hydrogen siloxane having a viscosity of 20–40 mm$^2$/s in amounts such that the ratio of Si—H groups: to aliphatically unsaturated hydrocarbon groups was 2.0: 1. 120 ppm of a platinum catalyst was included in every sample together with 0.12% by weight of the total composition weight of methyl butynol inhibitor.

The substrate in each case was a corona treated glassine paper. The polymer and cross-linking agent compositions of each sample analysed is provided in the following Table.

TABLE 2

Premium Release compositions used for the Anchorage Index tests

| Sample | Polymer | x-linker |
|--------|---------|----------|
| A | 80 DP Q | 1 |
| B | 80 DP Q | 3 |
| C | 50 DP linear | 1 |
| D | 50 DP linear | 3 |
| E | 150 DP linear | 1 |
| F | 150 DP linear | 3 |

The results of the Anchorage index tests in Table 3 with compositions A and B, which contain the branched polymer of the current invention, having low values of extractables and maintaining a relatively high % anchorage index. Compositions C and D which comprise the linear vinyl dimethyl silyl terminated polydiorganosiloxane with a DP of 50 provide acceptable extractables levels but totally unacceptable results for the anchorage index whereas conversely the relatively long chain 150 DP linear vinyl dimethyl silyl terminated polydiorganosiloxane with a DP of 150 provide poor extractables results but good anchorage index results.

EXAMPLE 6

In this example the branched siloxane in accordance with the present invention is utilised as part of a release modifier.

TABLE 3

Anchorage Index at a corona level (kW) of 0.21 in combination with trimethyl silyl end-blocked methyl hydrogen siloxane cross-linking agent

| Formulations | % Extractables | | 1 day | | 1 week | | 2 weeks | | 1 month | |
|---|---|---|---|---|---|---|---|---|---|---|
| corona level | 0.21 | 0.38 | 0.21 | 0.38 | 0.21 | 0.38 | 0.21 | 0.38 | 0.38 | 0.21 |
| A | 3.1 | 5.2 | 88.6 | 94.2 | 97.1 | 88.6 | 84.3 | 96 | 75.6 | 69.4 |
| B | 3.8 | 2.3 | 96.2 | 86.2 | 95.4 | 96.8 | 88.2 | 77.7 | 82.5 | 57.7 |
| C | 2.8 | — | 91.6 | 92.2 | 79.1 | 87.4 | 79.2 | 79.1 | 31 | 12.9 |
| D | 3.2 | 4.7 | 91.5 | 92.2 | 96.3 | 89.8 | 79.1 | 84.4 | 74.8 | 18.8 |
| E | 7.5 | 7.8 | 98 | 94.5 | 100 | 91.7 | 57.1 | 82 | 15.9 | 40.2 |
| F | 7.7 | 7.8 | 94.4 | 96.6 | 93.1 | 99.3 | 93.2 | 92.2 | 92.7 | 80.8 |

The polymer indicated in Table 4 is a dimethyl vinyl silyl terminated dimethyl siloxane with a viscosity of 200 mm²/s. The values given in relation to the polymer and release modifier are the percentage weights relative to the total weight of the polymer and modifier.

In compositions G and H the release modifier comprises 70% by weight of a dimethyl vinyl siloxy and trimethyl siloxy terminated MQ resin and 30% by weight of a mixture of octadecene and tetradecene. In examples I and J 50% of the alkenes present are replaced by a branched siloxane in accordance with the invention having a DP of 20. An appropriate amount of a platinum based catalyst was also incorporated in to the composition.

A sample of each composition was coated onto a piece of glassine paper and cured at a temperature of 150° C. for a period of thirty seconds.

High speed release performance delamination tests (HSRPD) (g/50 mm) were also determined using a commercially available laminate as a source of adhesive control feedstock tape. For HSRPD the coated papers were aged for 7 days at 23° C. and 50% relative humidity. Laminates were prepared by applying the hot melt adhesive coated high gloss white facestock (roll label in Table 4) onto the cured coatings. The laminates were aged under a 25 kg weight at a temperature of 60° C. for a period of 20 hours, to ensure intimate wetting of adhesive on the silicone based coating. Delamination was in these cases undertaken using an Instrumentors Inc. ZPE-1000 High Rate Peel Tester at a variety of speeds.

TABLE 4

| Formulation | Premium | G | H | I | J |
| --- | --- | --- | --- | --- | --- |
| Polymer | 100 | 50 | 25 | 50 | 25 |
| Release modifier | 0 | 50 | 75 | 50 | 75 |
| X-linker 1 | 2.37 g | 8.04 g | 10.87 g | 6.48 g | 8.56 g |
| Catalyst | 2 g | 2 g | 2 g | 2 g | 2 g |
| Extractables | 3.3 | 3.8 | 4.6 | 3.3 | 3.3 |
| HSRPD (Roll Label) | | | | | |
| 0.3 m/min | 3.2 | 35.7 | 36.6 | 51.7 | 172.6 |
| 10 m/min | 6.6 | 31.4 | 124.3 | 34.7 | 127.8 |
| 20 m/min | 8.6 | 31.3 | 93.8 | 35.3 | 103.7 |
| 100 m/min | 15.2 | 29 | 54.8 | 31.8 | 49.5 |
| 200 m/min | 18.4 | 24.7 | 37 | 28.7 | 33.7 |

It is to be noted that, in terms of extractables, the cure with respect to coatings containing the branched siloxane remain at the same level as that for the premium release coating, whereas the extractables values for comparative coatings increase in line with increases of the release modifier content. Furthermore, reduction in alkene content in the release modifier composition lead to maintenance of release forces but a significant reduction in the effect of smoking during the cure process.

EXAMPLE 7

In the following example the polymer, cross-linking Agent and catalyst are exactly the same as in example 6. However, the release modifier comprises 55% by weight of vinyl dimethyl silyl terminated polydimethylsiloxane with a degree of polymerisation of 20 in composition K and is a branched siloxane in accordance with the invention with a degree of polymerisation of 20 in composition L, in both cases together with 45% by weight of a dimethyl vinyl siloxy and trimethyl siloxy terminated MQ resin.

Low speed Release performance delamination tests (LSRPD) were carried out using a TESA® 7475 tape which uses an acrylic adhesive. In each of these tests delamination was undertaken using a Lloyd® Instruments L500 Tensometer at a delamination speed of 0.3 m/min.

In these cases different criteria were used to test the performance after different set periods of time. Imm. (Immediate)/1 day means that the relevant coating was laminated with a strip of TESA® 7475 tape immediately after curing and delamination was undertaken subsequent to conditioning the laminate for a further day at 23° C. and 50% relative humidity. Similarly Imm/7 days means that lamination was again immediate but delamination was undertaken subsequent to conditioning the laminate for a period of 7 days at 23° C. and 50% relative humidity. 7 Days/1 day means that lamination was undertaken 7 days after curing and delamination was carried out after conditioning the laminate for a further day at 23° C. and 50% relative humidity. Finally, 7day/7 day means that lamination was undertaken 7 days after curing and delamination was carried out after conditioning the laminate for a further 7 days at 23° C. and 50% relative humidity. HSRPD results were obtained in exactly the same way as in example 6.

TABLE 5

| Formulation | Premium | K | L |
| --- | --- | --- | --- |
| Polymer | 100 | 75 | 75 |
| Release Modifier | 0 | 25 | 25 |
| X-linker 1 | X | X | X |
| Catalyst | 2 | 2 | 2 |
| Extractables | 3.3 | 3.6 | 2.9 |
| LSRPD | | | |
| Tesa 7475 | 18.3 | 19.9 | 28.9 |
| I mm/1 day | | | |
| I mm/7 day | 15.8 | 26.4 | 45 |
| 7 day/1 day | 6.5 | 10.2 | 11 |
| 7 day/ 7day | 11.4 | 12.6 | 17.9 |
| HSRPD (Roll Label) | | | |
| 0.3 m/min | 3.2 | 5.3 | 7.3 |
| 10 m/min | 6.6 | 10 | 11.5 |
| 20 m/min | 8.6 | 11.3 | 12.6 |
| 100 m/min | 15.2 | 16 | 16.8 |
| 200 m/min | 18.4 | 17.5 | 15.8 |

It is to be noted that when replacing the whole of the release modifier polymer with branched siloxane of the first aspect the present invention Extractable values decrease compared to the premium release coating.

What is claimed is:

1. A multi-pack release coating composition comprising a first pack comprising a branched siloxane consisting of (a) at least one Q unit of the formula ($SiO_{4/2}$) and (b) from 15 to 995 D units of the formula $R^b{}_2SiO_{2/2}$ which units (a) and (b) may be inter-linked in any appropriate combination, and (c) M units of the formula $R^aR^b{}_2SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group, and a hydrosilylation inhibitor, a second pack comprising a silicone release modifier and hydrosilylation inhibitor, a third pack comprising a hydrosilylation catalyst in a sufficient amount to catalyse the reaction between the branched siloxane and a cross-linking agent and a fourth pack comprising the organohydrogenpolysiloxane cross-linking agent in an amount such that the ratio of the total number of Si—H groups in the composition to aliphatically unsaturated hydrocarbon groups in the composition is from 0.9:1 to 3:1.

2. A multi-pack release coating composition of claim 1 where the branched siloxane has the general formula

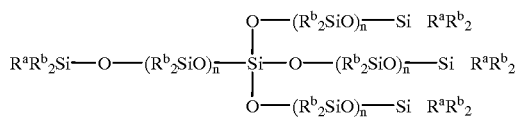

where each n is independently from 1 to 100.

3. A multi-pack release coating composition according to claim 1 where at least 50 percent of the $R^a$ substituents are alkenyl groups.

4. A multi-pack release coating composition comprising a first pack comprising a branched siloxane consisting of (a) at least one Q unit of the formula ($SiO_{4/2}$) and (b) from 15 to 995 D units of the formula $R^b{}_2SiO_{2/2}$ which units (a) and (b) may be inter-linked in any appropriate combination, and (c) M units of the formula $R^a R^b{}_2 SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group; and catalyst, a second pack comprising a silicone release modifier and catalyst, and a third pack comprising an organohydrogenpolysiloxane cross-linking agent and hydrosilylation inhibitor.

5. A multi-pack release coating composition according to claim 4 where at least 50 percent of the $R^a$ substituents are alkenyl groups.

6. A multi-pack release coating composition of claim 4 where the branched siloxane has the general formula

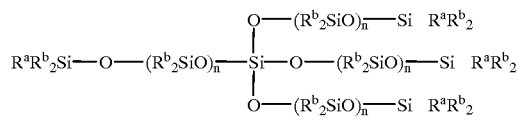

where each n is independently from 1 to 100.

7. A multi-pack release coating composition comprising a first pack comprising a branched siloxane consisting of (a) at least one Q unit of the formula ($SiO_{4/2}$) and (b) from 15 to 995 D units of the formula $R^b{}_2SiO_{2/2}$ which units (a) and (b) may be inter-linked in any appropriate combination, and (c) M units of the formula $R^a R^b{}_2 SiO_{1/2}$, wherein each $R^a$ substituent is selected from the group consisting of an alkyl group having from 1 to 6 carbon atoms, an alkenyl group having from 1 to 6 carbon atoms and an alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group; and a hydrosilylation inhibitor, a second pack comprising a silicone release modifier and hydrosilylation inhibitor, a third pack comprising a hydrosilylation catalyst, and a fourth pack comprising an organohydrogenpolysiloxane cross-linking agent.

8. A multi-pack release coating composition according to claim 7 where at least 50 percent of the $R^a$ substituents are alkenyl groups.

9. A multi-pack release coating composition of claim 7 where the branched siloxane has the general formula

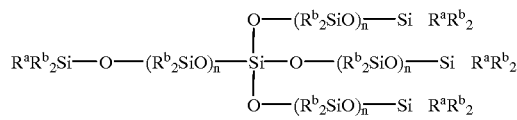

where each n is independently from 1 to 100.

* * * * *